April 27, 1965
D. E. A. TANNENBERG
3,180,137
COMBINED MOTION TESTER
Filed Jan. 16, 1963
2 Sheets-Sheet 1
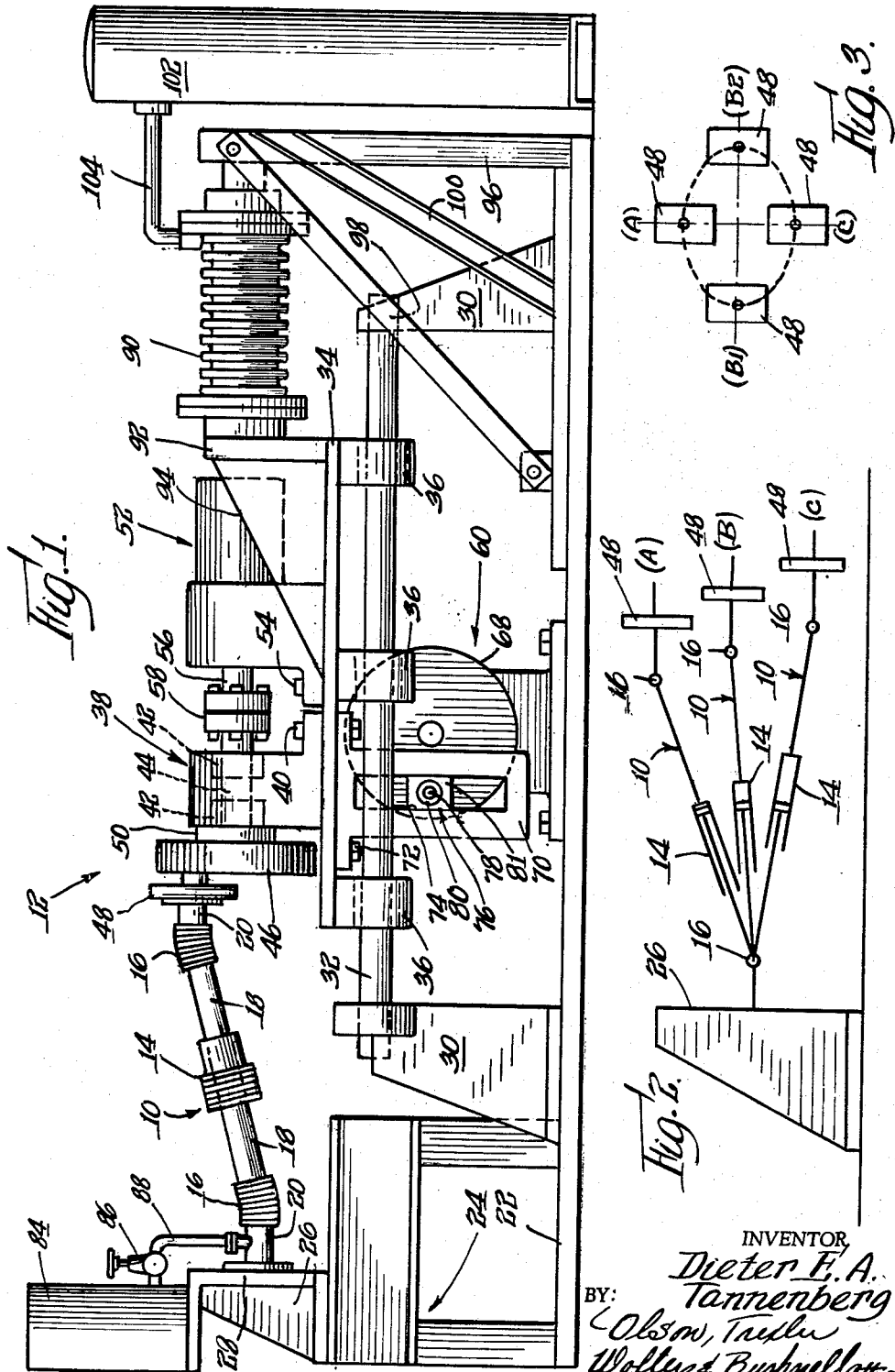
INVENTOR
Dieter E. A. Tannenberg
BY Olson, Trexler
Wolters & Bushnell attys.

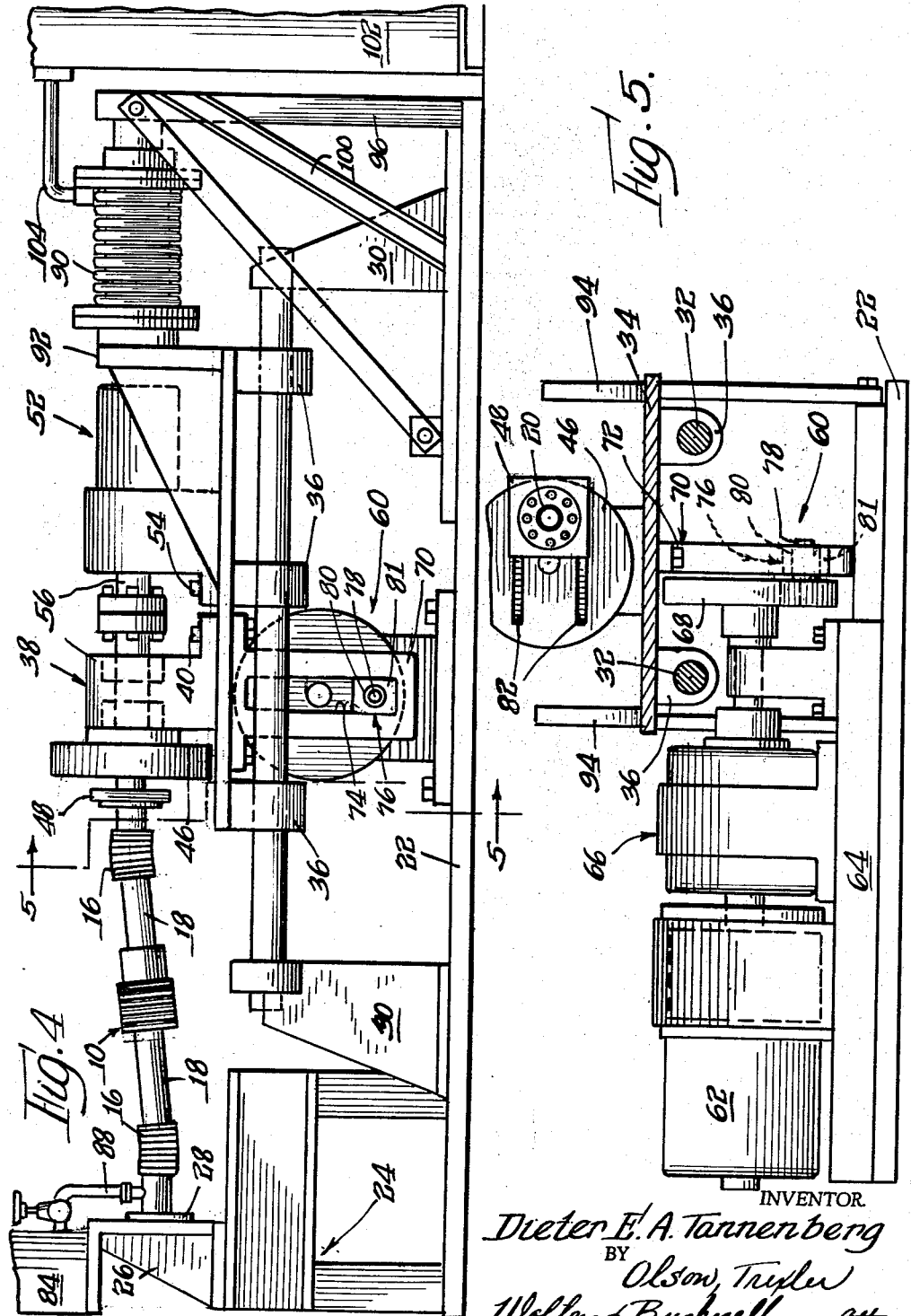

United States Patent Office 3,180,137
Patented Apr. 27, 1965

3,180,137
COMBINED MOTION TESTER
Dieter E. A. Tannenberg, Palatine, Ill., assignor to Calumet & Hecla, Inc., Chicago, Ill., a corporation of Michigan
Filed Jan. 16, 1963, Ser. No. 251,925
7 Claims. (Cl. 73—100)

This invention relates generally to test equipment and especially to testing apparatus arranged to impart repetitive motion to a test specimen.

Many situations arise in which a particular component is forced to undergo flexing motions in its use; and frequently, preliminary knowledge of the resistance of the component to such motion is essential to a determination of its ultimate suitability for the intended use or to a determination of the most economical design that is acceptable for a given application. Testing of replicate components can provide such knowledge; but heretofore, existing test equipment has been arranged to impart purely one type of motion or another. For example, certain types of test equipment have been arranged to impart relative reciprocal motion to a portion of a specimen for testing its axial characteristics while different types of equipment have been arranged to impart relative rotary motion to a portion of a specimen for testing its radial or flexural characteristics. However, separate testing of a component for its resistance to different types of motion does not necessarily produce reliable information regarding the resistance of the component to combinations of these same types of motion; and in the past, components that are subjected to combined motions in use have failed much earlier than predicted by the results of separately testing their resistance to the individual types of motion.

Therefore, an important object of the present invention is to provide apparatus that is arranged to impart a combination of rotational and linear motion to a test specimen.

Another object of the invention is to provide testing apparatus that is capable of imparting various combinations of linear and rotational motion.

Still another object of the invention is to provide testing apparatus that is arranged to impart either rotational or linear motion or a combination of such motions to the specimen.

A more general object of the invention is to provide new and improved testing apparatus.

A further object of the invention is to provide a combined motion tester which imparts a motion pattern that includes a component of linear motion having true harmonic character.

A yet further object of the invention is to provide motion testing apparatus that is compensated for axial thrust of the test specimen.

These and other objects and features of the invention will become more apparent from a consideration of the following disclosures.

Apparatus in accord with the invention includes a mounting formation adapted to secure one end of a test specimen in fixed position, a table mounted for oscillating movement toward and away from the formation, a Scotch yoke arrangement acting between a structure fixed relative to the mounting formation and the table to impart oscillating movement to the table, a formation rotatably mounted on the table and adapted for securing the other end of the test specimen thereto, and a rotary drive for this last formation.

The invention, both to its structure and mode of operation, will be better understood by reference to the following disclosure and drawings forming a part thereof, wherein:

FIG. 1 is a side elevational view of testing apparatus constructed in accordance with the invention and showing a specimen flexed to one position in a path of test motion;

FIG. 2 is a schematic side elevational view illustrating several positions of the test specimen;

FIG. 3 is an end elevational showing of the motion test pattern of FIG. 2 viewed in the plane of motion;

FIG. 4 is a view similar to the showing of FIG. 1 but illustrating the apparatus conditioned to situate the test specimen in a different position in its pattern of test movement; and FIG. 5 is an end elevational view taken substantially along the line 5—5 of FIG. 4.

Referring now in detail to the drawings, specifically to FIG. 1, a test specimen indicated generally by the numeral 10 is seen mounted in test apparatus 12 for exposure to a combination of axial and rotary motion. The type of unit ordinarily tested in this fashion comprises an expansion joint 14 which permits axial elongation and contraction of the unit, the unit further comprising one or more gimbal joints 16 which accommodate a universal type of relative movement between the opposite ends of the unit. When the unit is intended to make a fluid connection in use, rather than a mere mechanical connection, the joints 14 and 16 are oftentimes connected by tubular elements 18. Flanged and tubular end fittings 20 are also frequently incorporated. The tested unit may also take the form of a bellows or a section of corrugated metal hose, for example.

The apparatus 12 includes a base frame 22 upon which there is mounted an end structure 24. The end structure 24 incorporates a formation 26, and one of the flanged fittings 20 of the test specimen is attached to a plate portion 28 of the formation 26 to secure that end of the test specimen in fixed position.

Spaced pedestals 30 are also mounted on the base frame 22; and spaced, horizontal shafts 32 are secured between the pedestals 30. A platform or table 34 comprises an important element of the apparatus 12, and the table 34 is mounted for oscillating movement toward and away from the structure 24 and the formation 26 by means of journal blocks 36 which slidably receive the shafts 32. A fixture 38 is fastened on the top of the table 34 by suitable means such as bolts 40, the fixture 38 incorporating bearings 42 which journal a shaft 44. An output plate 46 is secured to one end of the shaft 44 while a plate formation 48 is adjustably positioned on the plate 46 in eccentric location relative to the shaft 44. A thrust bearing 50 is advantageously interposed between the output plate 46 and the confronting face of fixture 38.

The flanged fitting 20 at the otherwise free end of the test specimen 10 is connected to the plate formation 48; and the plate formation 48 is intended to be oscillated and rotated relative to the fixed formation 28 for purposes of imparting a desired rotary motion pattern to the test specimen 10. In order to impart rotary motion to the plate formation 48, an electric motor 52 is fastened to the top of platform 34 as by bolts 54, the motor 52 being situated with its output shaft 56 aligned with the shaft 44 so that a coupling 58 may make mechanical connection therebetween.

In compliance with an important feature of the invention, the means for imparting oscillating movement to the table 34 and therefore to the test specimen includes a Scotch yoke arrangement indicated generally in FIG. 1 by the numeral 60. Continuing with reference to FIG. 1 and additionally considering FIG. 5, the Scotch yoke arrangement 60 is seen to include an electric motor 62 which is mounted on the base frame 22 by means of a platform 64. The output shaft of motor 62 is connected to a variable speed transmission 66; and the output shaft of the transmission is coupled to a circular drive plate 68. The Scotch yoke arrangement 60 also includes a guide plate 70 which is mounted to the table 34 in depending relationship by suitable means such as bolts 72. A vertical, closed-end slot 74 is formed in the plate 70; and the output plate 68 is mechanically connected to the table 34 by a coupling member 76 which is slidably received in the slot 74 and which is mounted to the plate 68 in eccentric relationship with respect to the drive shaft therefor. Advantageously, the member 76 comprises a post 78 which is surrounded by a bearing 80, bearing 80 being rotatably mounted in a rectangular slide 81. The eccentricity of the coupling member 76 is made variable by suitable means, such as for example by providing the drive plate 68 with several mounting positions for the post 78, which mounting positions are disposed at different radial distances from the center of the drive plate.

When a Scotch yoke arrangement, such as the arrangement 60, is employed in oscillating the table 34, the motions of the table 34 are of simple harmonic character; and when the oscillations of table 34 follow the laws of simple harmonic motion, these oscillations may be readily combined with the rotation afforded by means of motor 52 to develop short cycles of motion in the test specimen. Such short cycles of motion of the test specimen are advantageous in that repetitive testing can be completed in a relatively short overall time. Although a slider-crank arrangement can be substituted for the Scotch yoke arrangement, a slider-crank arrangement is not capable of generating a simple harmonic output because the crank rod has a variable projection in the horizontal plane.

With particular reference to FIG. 5, it is noted that the plate formation 48 is radially slidably coupled to the output plate 46 by means including the guide slots 82. Thus, the eccentricity of the plate formation 48 may be varied; and it will be recalled that the eccentricity of the coupling member 76 may also be varied. The variability of these arrangements permits the selection of a desirable horizontal stroke and a desired rotational traverse in the specimen being tested. Moreover, it has been described hereinabove that the Scotch yoke drive motor 62 functions through a variable speed transmission 66; and this additional variability allows the selection of a desired phase relationship between the linear or axial motion incurred by means of the Scotch yoke and the rotational motion incurred by means of the drive motor 52.

The combined motions imparted to the plate formation 48 and transmitted therefrom to the test specimen 10 will be understood more fully by reference to FIGS. 2 and 3. There, the configurations noted at B represent a vertically neutral position of the test specimen whereas the configurations A and C denote both the vertical and horizontal extremes. It will be observed that the test specimen is axially elongated in going from the B configuration to the C configuration and is axially compressed in going from the B configuration to the A configuration. Moreover, it will be noted that two B positions exist horizontally spaced from each other laterally of the axis of the motion pattern by virtue of the rotation imparted from motor 52. On the other hand, the horizontal displacement between the configurations A and C is the result of the movements imparted from the Scotch yoke arrangement 60.

In FIG. 3, it will be noted that the plate formation 48 traces an elliptical path in the plane of motion; and such a path is achieved by properly synchronizing the rotary and oscillatory drive arrangements. By varying the phase relationship of these drive arrangements, as for example by varying the speed of plate 68 through adjustment of the transmission 66, other pattern may be traced such as a hyperboloid or a reversing spiral. This phase relationship may also be varied to produce complex motion patterns having a prolonged cycle under circumstances wherein testing by near random motion is required.

It is also important to realize that either the rotary or the oscillatory drive arrangements can be disabled in order to impart either of the motions without its combination with the other. One simple way of disabling the Scotch yoke arrangement 60 is to place the coupling 76 at the center of drive plate 68. Similarly, the rotary drive may be substantially disabled by resituating the plate formation 48 in alignment with the axis of shaft 44.

Under some circumstances, it is desired to determined the flexural resistance of a component while the same is subjected to internal fluid pressure. Therefore and returning to FIG. 1, a tank 84 filled with a pressurized fluid is seen connected to the fixed flanged fitting 20 through a regulating device 86 and conduit 88. Under circumstances in which the test specimen is pressurized in this fashion, it is advantageous to provide a balancing arrangmeent for counteracting horizontal thrust forces imposed by the test specimen on the table 34 and its associated elements, which forces arise upon extension or contraction in the length of the test specimen during its cycle of motion. For this purpose, the apparatus 12 includes a back-up bellows 90 aligned with the axis of drive motor 52, and desirably with the axis of the mounting formation 28, oppositely of the test specimen 10. One end of the bellows 90 is connected to the table 34 by an upright plate 92, plate 92 being horizontally braced by side plates 94. The opposite end of bellows 90 is connected to a post 96 which upstands from the base frame 22. A pair of fixed links 98 extend diagonally from the top of post 96 to a medial location on the base frame 22 for mechanically connecting axial thrust from the bellows to the base frame. Additional side members 100 extend from the post 96 to the base frame 22 to achieve a double gusseted mounting of the post.

A tank 102 of relatively large volume is connected to the bellows by a conduit 104. The tank 102 and the bellows 90 are filled with a suitable fluid such as air. and the relatively large volume of the tank 102 provides a substantially constant balancing force for damping the axial thrust resistance of the pressurized test specimen. It is recognized that the bellows 90 may be replaced by a piston and cylinder arrangement if desired.

Operation of the testing apparatus of the invention is apparent from the above descriptions.

While a particular embodiment has been shown and certain variations have been described, it should be realized, of course, that the invention is not limited thereto since many modifications may be made. Therefore, any such modifications as fall within the spirit and scope of the appended claims are to be understood as forming a part of this invention.

The invention is claimed as follows:

1. Apparatus for imparting a combination of linear and rotary motion to a test specimen comprising: a mounting formation for securing one end of a test specimen in fixed position; table means mounted for oscillating movement toward and away from said formation; means acting between siad mounting formation and said table means to impart oscillating movement to said table means; and rotatable means mounted on said table means for securing the other end of the test specimen thereto in eccentric relation relative to the rotational axis thereof.

2. Apparatus for imparting a combination of linear and rotary motion to a test specimen comprising: first structure means including a mounting formation for securing one end of a test specimen in fixed position; table means mounted for oscillating movement toward and away from said formation; second structure means fixed relative to said first structure means; means acting between said second structure means and said table means to impart oscillating movement to said table means; a formation rotatably mounted on said table means adapted for securing the other end of the test specimen thereto in eccentric relation relative to the rotational axis thereof; and rotary drive means for said last mentioned formation.

3. Apparatus for imparting a combination of linear and rotary motion to a test specimen comprising: first structure means including a mounting formation for securing one end of a test specimen in fixed position; table means mounted for oscillating movement toward and away from said formation; second structure means fixed relative to said first structure means; a Scotch yoke arrangement acting between said second structure means and said table means to impart oscillating movement to said table means; a formation rotatably mounted on said table means adapted for securing the other end of the test specimen thereto in eccentric relation relative to the rotational axis thereof; and rotary drive means for said last mentioned formation.

4. Apparatus for imparting a combination of linear and rotary motion to a test specimen comprising: first structure means including a mounting formation for securing one end of a test specimen in fixed position; table means mounted for oscillating movement toward and away from said formation; second structure means fixed relative to said first structure means; means acting between said second structure means and said table means to impart oscillating movement to said table means, including a motor secured to said second structure means and having an output shaft, a coupling member eccentrically connected to said shaft, and means defining a closed vertical slot connected to said table means, said coupling member being slidably received in said slot to cooperate in converting the rotary motion of said shaft to oscillating movement of said table means; a formation rotatably mounted on said table means adapted for securing the other end of the test specimen thereto in eccentric relation relative to the rotational axis thereof; and rotary drive means for said last mentioned formation.

5. The combination according to claim 4 and further comprising a variable speed transmission connecting said motor to said coupling member whereby to adjust the phase relation between the linear component and the rotary component of the combined motion imparted to the test specimen.

6. The combination according to claim 4 and further comprising means for varying the eccentricity of the rotatably mounted formation and additionally comprising means for varying the eccentricity of said coupling member whereby to vary the size of the rotary motion path and the linear motion path respectively.

7. Apparatus for imparting a combination of linear and rotary motion to a test specimen comprising: first structure means including a mounting formation for securing one end of a test specimen in fixed position; table means mounted for oscillating movement toward and away from said formation; second structure means fixed relative to said first structure means; a Scotch yoke arrangement acting between said second structure means and said table means to impart oscillating movement to said table means; motion output means rotatably mounted on said table means including a formation situated eccentrically relative to the rotational axis of said output means for securing the other end of the test specimen thereto; rotary drive means for said motion output means coupled thereto at the rotational axis thereof; means for pressurizing the interior of the test specimen; and means connected to the table means in opposition with said test specimen, including fluid damping means aligned with the axis of said rotary drive means to balance said table means against the axial thrust resistance of the pressurized test specimen.

References Cited by the Examiner
UNITED STATES PATENTS

| | | | |
|---|---|---|---|
| 1,512,063 | 10/24 | Sproull | 73—100 X |
| 1,896,114 | 2/33 | Thomson | 73—100 X |
| 2,761,310 | 9/56 | Siegel | 73—100 X |

RICHARD C. QUEISSER, *Primary Examiner.*

JOSEPH P. STRIZAK, *Examiner.*